(12) United States Patent
Roberge

(10) Patent No.: US 10,107,157 B2
(45) Date of Patent: Oct. 23, 2018

(54) GAS TURBINE ENGINE LUBRICATION SYSTEM

(71) Applicant: United Technologies Corporation, Hartford, CT (US)

(72) Inventor: Gary D. Roberge, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 646 days.

(21) Appl. No.: 14/713,009

(22) Filed: May 15, 2015

(65) Prior Publication Data

US 2015/0361886 A1    Dec. 17, 2015

Related U.S. Application Data

(60) Provisional application No. 62/003,577, filed on May 28, 2014.

(51) Int. Cl.
| | | |
|---|---|---|
| *F01M 1/12* | (2006.01) | |
| *F01D 25/20* | (2006.01) | |
| *F02C 7/06* | (2006.01) | |
| *F16H 57/04* | (2010.01) | |

(52) U.S. Cl.
CPC ............. *F01M 1/12* (2013.01); *F01D 25/20* (2013.01); *F02C 7/06* (2013.01); *F16H 57/0439* (2013.01); *F01M 2001/123* (2013.01); *F16N 2260/00* (2013.01)

(58) Field of Classification Search
CPC .. F04B 9/02; F04B 17/03; F04B 23/02; F04B 23/04; F04B 29/005; F04B 29/063; F04B 35/01; F04B 35/04; F04B 41/02; F04B 41/06; F04B 49/007; F04B 49/22; F04C 15/0061; F04C 15/0072; F04C 11/00; F04C 14/02; F04C 14/24; F04C 28/24; F04C 23/00; F04C 23/02; F04C 25/028; F04C 29/005; F04C 2210/14; F01M 1/12; F01M 2001/123; F01D 25/18; F01D 25/20; F16N 7/40; F16N 13/20; F16N 2260/00; F02C 7/06; F16H 57/0439
USPC ........................................................ 184/6.11
See application file for complete search history.

(56) References Cited

U.S. PATENT DOCUMENTS

| | | | |
|---|---|---|---|
| 3,626,693 A | * | 12/1971 | Hart .................. F01D 25/18 |
| | | | 123/196 S |
| 3,722,212 A | | 3/1973 | Stein |
| 5,245,820 A | | 9/1993 | Zalewski et al. |
| 5,472,383 A | | 12/1995 | McKibbin |
| 5,735,116 A | * | 4/1998 | Mouton .................. F02C 7/262 |
| | | | 60/39.091 |
| 6,223,616 B1 | | 5/2001 | Sheridan |
| 6,463,819 B1 | | 10/2002 | Rago |

(Continued)

OTHER PUBLICATIONS

Extended European Search Report for European Patent Application No. 15169344.7, dated Nov. 2, 2015.

*Primary Examiner* — Bryan Lettman
*Assistant Examiner* — Charles W Nichols
(74) *Attorney, Agent, or Firm* — Carlson, Gakey & Olds, P.C.

(57) ABSTRACT

A lubrication system includes a lubrication tank, a gearbox driven pump, an electrically driven pump located in parallel with the gearbox driven pump, and a first control valve for selectively connecting the electrically driven pump or the gearbox driven pump with the lubrication tank.

8 Claims, 3 Drawing Sheets

(56) References Cited

U.S. PATENT DOCUMENTS

| | | |
|---|---|---|
| 7,174,997 B2 | 2/2007 | Sheridan |
| 7,849,668 B2 | 12/2010 | Sheridan |
| 8,230,974 B2 | 7/2012 | Parnin |
| 8,307,626 B2 | 11/2012 | Sheridan |
| 8,511,435 B2 | 8/2013 | Sheridan et al. |
| 2001/0047647 A1* | 12/2001 | Cornet .................. F01D 15/08 60/772 |
| 2010/0056315 A1 | 3/2010 | Scholte-Wassink |
| 2013/0047624 A1* | 2/2013 | Suciu ...................... F01D 25/20 60/772 |
| 2013/0118593 A1* | 5/2013 | Wright .................... B60K 6/48 137/2 |

* cited by examiner

GAS TURBINE ENGINE LUBRICATION SYSTEM

CROSS-REFERENCE TO RELATED APPLICATIONS

This application claims priority to U.S. Provisional Application No. 62/003,577, which was filed on May 28, 2014 and is incorporated herein by reference.

BACKGROUND

This disclosure relates to a lubrication system for providing lubricant to a gas turbine engine, and more particularly, to a bearing system and a geared architecture on the gas turbine engine.

Gas turbine engines typically include a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The gas turbine engine includes various components that require lubrication. A main lubrication system generally provides lubrication to these components. A pump for the main lubrication system is generally powered by a gearbox in communication with a spool on the gas turbine engine through a tower shaft.

SUMMARY

In one exemplary embodiment, a lubrication system includes a lubrication tank, a gearbox driven pump, an electrically driven pump located in parallel with the gearbox driven pump, and a first control valve for selectively connecting the electrically driven pump or the gearbox driven pump with the lubrication tank.

In a further embodiment of any of the above, a second control valve is located downstream of an output to the gearbox driven pump and an output to the electrically driven pump.

In a further embodiment of any of the above, the first control valve and the second control valve are configured to selectively move between a first position to allow lubricant only through the gearbox driven pump and a second position to allow lubricant only through the electrically driven pump.

In a further embodiment of any of the above, a third control valve is located downstream of the second control valve for selectively directing lubrication between at least one of a speed change mechanism on a gas turbine engine and rotor support bearings on the gas turbine engine.

In a further embodiment of any of the above, a lubrication cooler is located downstream of the second control valve and upstream of the third control valve.

In a further embodiment of any of the above, a third control valve is located downstream of the second control configured to selectively move between a first position for providing lubricant to a speed change mechanism and bearing systems and a second position for providing lubricant only to the speed change mechanism.

In a further embodiment of any of the above, the electrically driven pump receives power from a vehicle power distribution control.

In a further embodiment of any of the above, the power distribution control is in electrical communication with a first gas turbine engine and a second gas turbine engine.

In a further embodiment of any of the above, there is a gearbox for driving the gearbox driven pump.

In a further embodiment of any of the above, a tower shaft mechanically connects the gearbox with a high speed spool.

In another exemplary embodiment, a method of lubricating a speed change mechanism on a gas turbine engine includes selecting a first pump to supply lubricant to the speed change mechanism and bearing systems in response to a first vehicle condition and selecting a second pump to supply lubricant to the speed change mechanism in response to a second vehicle condition. The first pump is located fluidly in parallel with the second pump.

In a further embodiment of the above, the method includes driving the first pump with a gearbox.

In a further embodiment of any of the above, the first vehicle condition is operation of the gas turbine engine.

In a further embodiment of any of the above, the second vehicle condition includes at least one of wind milling or a stall of the gas turbine engine.

In a further embodiment of any of the above, the method includes driving the second pump with an electric motor.

In a further embodiment of any of the above, the second pump receives power from a power distribution control on a vehicle.

In a further embodiment of any of the above, the power distribution control receives power from a second gas turbine engine.

In a further embodiment of any of the above, the method includes supplying lubrication to rotor bearings on a gas turbine engine with the first pump.

In a further embodiment of any of the above, the method includes a first valve and a second valve for selectively moving between a first position and to allow fluid to flow through the first pump and a second position to allow fluid to flow through the second pump.

In a further embodiment of any of the above, the method includes a third valve for selectively directing fluid to at least one of the speed change mechanism or the bearing systems on the gas turbine engine.

DETAILED DESCRIPTION

Figure 1:
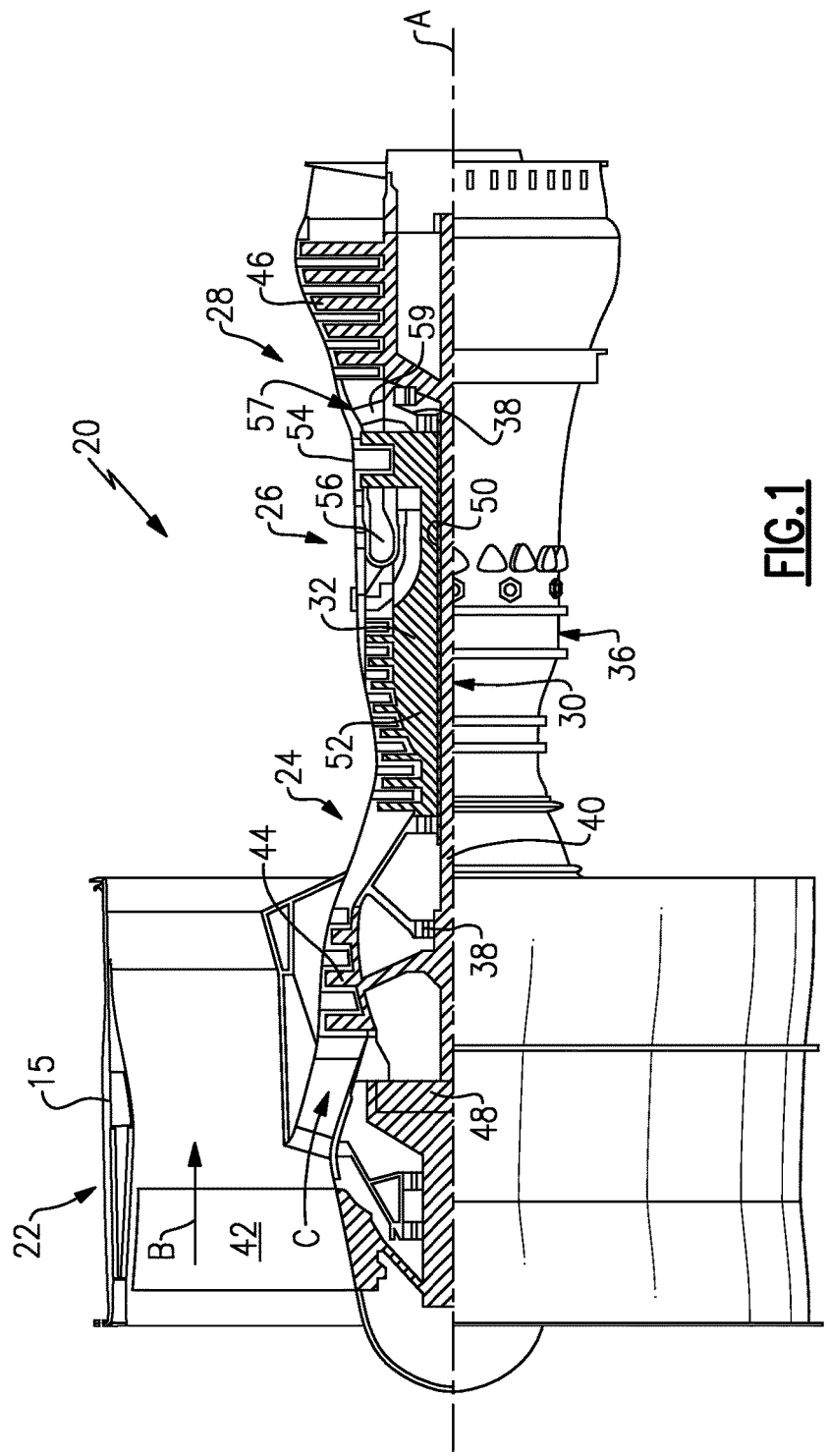
FIG. 1 shows a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
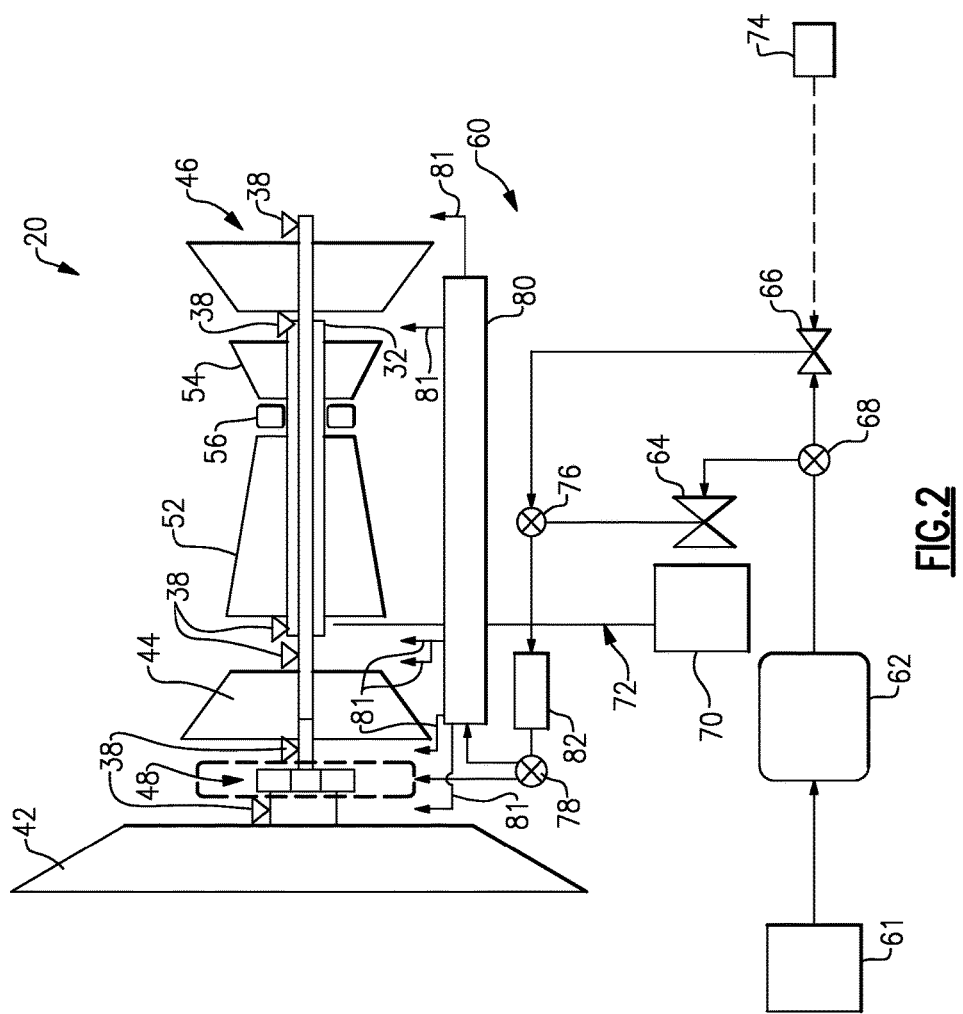
FIG. 2 shows an example lubrication system.

FIG. 2 shows a schematic view of a lubrication system 60 for the gas turbine engine 20. The lubrication system 60 provides lubricant, such as oil, to the geared architecture 48 and the bearing systems 38.

Oil collected from a scavenge system 61 is directed to an oil tank 62. A first control valve 68 directs the oil to a gearbox driven pump 64 when the first control valve is in a first position and to an electrically driven pump 66 when the first control valve 68 is in a second position.

The gearbox driven pump 64 is driven by a gearbox 70. The gearbox 70 receives rotational input from the high speed spool 32 through a tower shaft 72. During operation of the gas turbine engine 20, the rotation of the high speed spool 32 provides sufficient power for the gearbox driven pump 64 to pump oil to the geared architecture 48 and the bearing systems 38.

Figure 3:
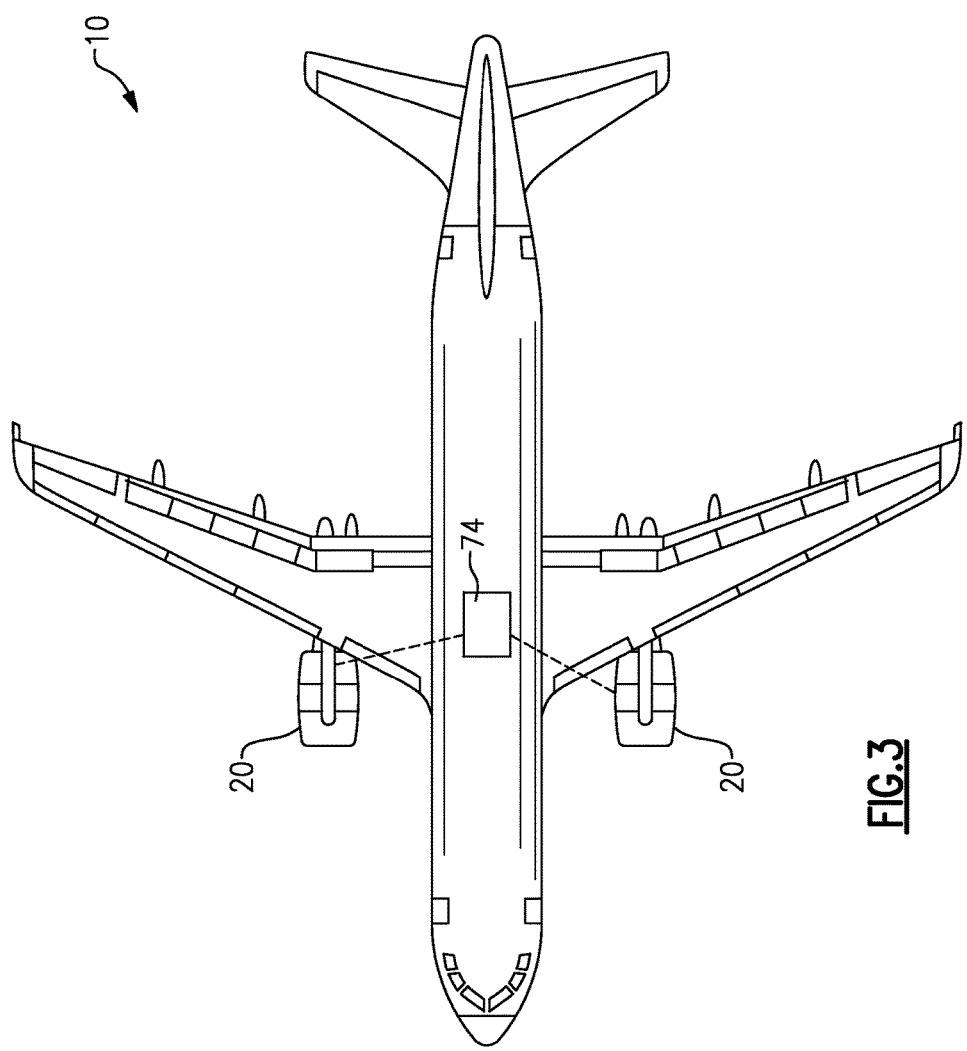
FIG. 3 shows an example vehicle.

The electrically driven pump 66 is driven by an electric motor that receives power from a power distribution control 74. In one example, the power distribution control 74 receives electrical power from generators powered by separate gas turbine engines 20 on an aircraft 10 as shown in FIG. 3.

A second control valve 76 is located downstream of outputs to both the electrically driven pump 66 and the gearbox driven pump 64 such that the pumps 64 and 66 are located fluidly in parallel. The second control valve 76 moves between a first position allowing oil from the gearbox driven pump 64 to reach the gas turbine engine 20 and a second position allowing oil from the electrically driven pump 66 to reach the gas turbine engine 20.

A third control valve 78 is located downstream of the second control valve 76. The third control valve 78 selectively directs oil to either the bearing systems 38 and the geared architecture 48 when in a first position or only the geared architecture 48 when in a second position. A supply manifold supplies oil to the bearing systems 38 through multiple An oil cooler 82 is located downstream of the second control valve 76 and upstream of the third control valve 78 for cooling the oil before the oil enters the geared architecture 48 or the bearing systems 38 through the supply manifold 80.

The lubrication system 60 is operated by selecting either the gearbox driven pump 64 or the electrically driven pump 66 to provide lubricant to at least one of the geared architecture 48 and the bearing systems 38. The gearbox driven pump 64 provides lubricant to both the geared architecture 48 and the bearing systems 38 during normal operation of the gas turbine engine 20 by receiving power through the gearbox 70. To utilize the gearbox driven pump 64, the first, second, and third control valves are moved to the first position and oil is able to flow to the geared architecture 48 and the bearing systems 38.

The electrically driven pump 66 is used when the gas turbine engine 20 is wind milling after engine shutdown to provide continued flow of lubricant to at least the geared architecture 48 under conditions where the gearbox driven pump 64 to longer receives sufficient power from the gearbox 70 to pump oil to the geared architecture 48 and the bearing systems 38. The electrically driven pump 66 receives power from a power distribution control 74 on the aircraft 10. The power distribution control 74 receives power from each of the gas turbine engines 20 on the aircraft as well as an auxiliary power supply unit on the aircraft 10 if present. To utilize the electrically driven pump 66, the first, second, and third valve controls are moved to the second position and oil is able to flow to only the geared architecture 48.

In an alternative embodiment, the electrically driven pump 66 can also be used when an anomaly is detected within the lubrication system 60 in the gas turbine engine 20. In this embodiment, the electrically driven pump 66 receives power from power distribution control 74 to supply oil to both the geared architecture 48 and the bearing systems 38. In order to supply oil to both the geared architecture 48 and the bearing systems 38, the first control valve 68 and the second control valve 76 moves into the second position and the third control valve 78 moves into the first position.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A lubrication system comprising:
    a lubrication tank;
    a gearbox driven pump;
    an electrically driven pump located in parallel with the gearbox driven pump; it 4 a first control valve for selectively connecting the electrically driven pump or the gearbox driven pump with the lubrication tank;
    a second control value located downstream of an output to the gearbox driven pump and an output to the electrically driven pump; and
    a third control valve located downstream of the second control valve configured to selectively move between a first position for providing lubricant to a speed change mechanism and bearing systems and a second position for providing lubricant only to the speed change mechanism.

2. The lubricant system as recited in claim 1, wherein the first control valve and the second control valve are configured to selectively move between a first position to allow lubricant only through the gearbox driven pump and a second position to allow lubricant only through the electrically driven pump.

3. The lubrication system as recited in claim 1, including a third control valve located downstream of the second control valve for selectively directing lubrication between at least one of a speed change mechanism on a gas turbine engine and rotor support bearings on the gas turbine engine.

4. The lubrication system as recited in claim 3, including a lubrication cooler located downstream of the second control valve and upstream of the third control valve.

5. The lubrication system as recited in claim 1, wherein the electrically driven pump receives power from a vehicle power distribution control.

6. The lubrication system as recited in claim 5, wherein the power distribution control is in electrical communication with a first gas turbine engine and a second gas turbine engine.

7. The lubrication system as recited in claim 1, including a gearbox for driving the gearbox driven pump.

8. The lubrication system as recited in claim 7, including a tower shaft mechanically connecting the gearbox with a high speed spool.

\* \* \* \* \*